(12) United States Patent
Ohuchi et al.

(10) Patent No.: US 6,474,307 B1
(45) Date of Patent: Nov. 5, 2002

(54) FUEL INJECTION CONTROL DEVICE FOR INTERNAL COMBUSTION ENGINE

(75) Inventors: Hirofumi Ohuchi, Tokyo (JP); Tadahiro Azuma, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 90 days.

(21) Appl. No.: 09/702,814

(22) Filed: Nov. 1, 2000

(30) Foreign Application Priority Data

May 18, 2000 (JP) ........................................ 2000-146776

(51) Int. Cl.$^7$ ............................................. F02D 41/04
(52) U.S. Cl. ................... 123/491; 123/480; 123/179.16
(58) Field of Search ................................ 123/491, 492, 123/179.16, 480, 478

(56) References Cited

U.S. PATENT DOCUMENTS

| | | | | |
|---|---|---|---|---|
| 4,995,366 A | * | 2/1991 | Manaka et al. | 123/492 |
| 5,492,101 A | * | 2/1996 | Saito et al. | 123/480 |
| 5,494,019 A | * | 2/1996 | Ogawa | 123/480 |
| 5,497,752 A | * | 3/1996 | Sagisaka et al. | 123/491 |
| 5,572,978 A | * | 11/1996 | Ogawa | 123/491 |
| 5,601,064 A | * | 2/1997 | Fujimoto et al. | 123/491 |
| 5,647,324 A | * | 7/1997 | Nakajima | 123/491 |
| 5,690,074 A | * | 11/1997 | Ogawa | 123/491 |
| 6,220,225 B1 | * | 4/2001 | Mencher et al. | 123/491 |

FOREIGN PATENT DOCUMENTS

| | | |
|---|---|---|
| JP | 6-17681 | 1/1994 |
| JP | 63-38638 | 2/1998 |

* cited by examiner

*Primary Examiner*—Gene Mancene
*Assistant Examiner*—Arnold Castro
(74) *Attorney, Agent, or Firm*—Sughrue Mion, PLLC

(57) ABSTRACT

The fuel injection control device includes a revolution detecting unit for detecting revolution of an internal combustion engine, an injector for injecting fuel into the internal combustion engine, and a fuel injection control unit for controlling the injection of fuel of the injector. The fuel injection control unit includes an engine-start-completion detecting unit for detecting whether or not the internal combustion engine has started, and a fuel-injection-amount correcting unit for correcting the amount of fuel to be injected, after the engine has started, by an amount of fuel for correction obtained by considering the amount of fuel remaining uncombusted when starting the engine and in accordance with one of the frequency of fuel injection, revolution of the internal combustion engine, and the elapse of time.

4 Claims, 11 Drawing Sheets

FIG. 9
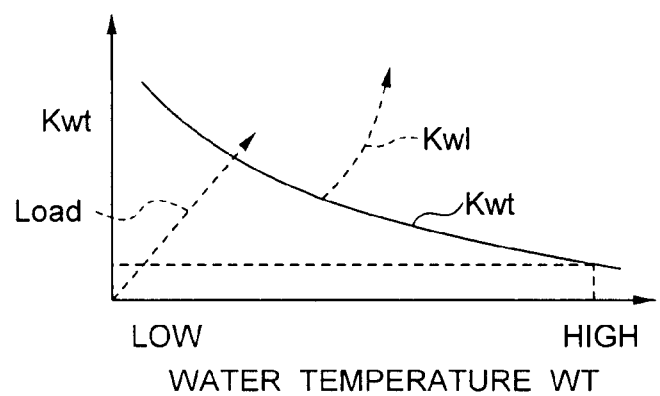
FIG. 10
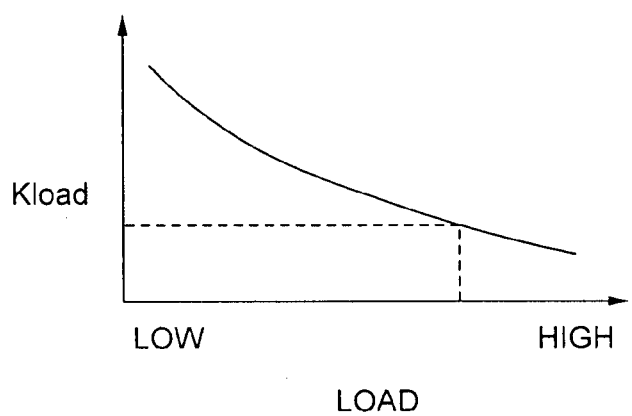
FIG. 11
| INJECTION FREQUENCY(n) | | | | | | | | | | | | |
|---|---|---|---|---|---|---|---|---|---|---|---|---|
| AMOUNT FOR CORRECTION(Q) | | | | | | | | | | | | |

FIG. 12

FUEL INJECTION CONTROL DEVICE FOR INTERNAL COMBUSTION ENGINE

BACKGROUND OF THE INVENTION

1. Field of the Invention

The present invention relates to fuel injection control devices for internal combustion engines. In particular, the present invention relates to a fuel injection control device for controlling injection of fuel into an internal combustion engine immediately after the engine has started.

2. Description of the Related Art

FIG. 4 is a graph showing a ratio A/F of the volume of air to fuel, revolution Ne, and the amount of injected fuel, when starting an internal combustion engine. Hitherto, a very large amount of fuel has been injected during a starting mode (between times t1 and t2), that is, after the engine is driven to start by a starter motor until the engine is brought into a full combustion state at a revolution of, for example, 500 rpm. Thereafter,-at the beginning of a normal operation mode before a stable operation starts at a time t3, the fuel to be injected has been reduced gradually so as not to hinder stable combustion (the amount of injected fuel is shown by dotted lines A in FIG. 4), and the ratio A/F of the volume of air to fuel has been controlled so as to be nearest to 14. 7 which is the theoretical air to fuel ratio.

During the starting mode (times t1 to t2), a very large amount of fuel is injected. In the starting mode, a phenomenon in which fuel gathers and adheres to the inside adjacent to an injector I of an intake pipe, as shown in FIG. 15, is likely to occur because the temperature of the internal combustion engine has not yet been sufficiently increased, the pressure in the intake pipe is increased, and the volume of air passing through the intake pipe has not been increased; therefore it is difficult for the fuel to vaporize.

In the normal operation mode (after the time t2), the fuel adhering to the intake pipe is likely to evaporate and to be led into a cylinder because of the increased air passing through the intake pipe and the reduced pressure therein. Particularly at the beginning (times t2 to t3) of the normal operation mode, that is, immediately after the starting mode, in most cases, the fuel fed into the cylinder is increased by that which has adhered to the intake pipe. In the normal operation mode immediately after the starting mode (times t2 to t3), relatively a large amount of the fuel is injected so as to stabilize the combustion, in which the fuel which has adhered to the intake pipe must be considered in addition to the fuel to be injected by the injector I. However, it is difficult to control the amount of fuel during this period, which is a rapid transition phase. Therefore, the amount of the fuel adhered to the intake pipe has been hitherto corrected in a stable operation mode (after the time t3) of the internal combustion engine.

In the above-described known fuel injection control device, a relatively large amount of fuel is injected in the normal operation immediately after the starting mode so as to stabilize the combustion, rather than reducing the fuel so as to correct for the amount of fuel for injection by an amount of fuel adhered to the inside of the intake pipe. As a result, the ratio A/F in this mode is greatly biased toward an excessive fuel-supply side, as shown by the dotted lines A in FIG. 4, whereby combustion exhaust gas is increased, thereby causing a problem with the emission control standards which have been recently difficult to meet.

SUMMARY OF THE INVENTION

Accordingly, it is an object of the present invention to provide a fuel injection control device for an internal combustion engine, in which the amount of combustion exhaust gas immediately after the engine is brought into a complete combustion state is reduced by considering the amount of fuel adhered to the inside of an intake pipe when starting the engine, that is, by reducing the amount of fuel to be injected.

To these ends, according to an aspect of the present invention, a fuel injection control device for an internal combustion engine comprises a revolution detecting unit for detecting revolution of the internal combustion engine; an injector-for injecting fuel into the internal combustion engine; and a fuel injection control unit for controlling the injection of fuel of the injector. The fuel injection control unit includes an engine-start-completion detecting unit for detecting whether or not the internal combustion engine has started, and a fuel-injection-amount correcting unit for correcting the amount of fuel to be injected, after the engine has started, by an amount of fuel for correction obtained by considering the amount of fuel remaining uncombusted when starting the engine and in accordance with one of the number of times of fuel injection, revolution of the internal combustion engine, and the elapse of time.

The fuel injection control device for an internal combustion engine according to the present invention may further comprise at least one of a load determining unit for determining the load on the internal combustion engine and an engine-temperature determining unit for determining the temperature of the internal combustion engine. In the fuel-injection-amount correcting unit, the amount of fuel for correction is adjusted in accordance with at least one of the load on the internal combustion engine and the temperature thereof.

In the fuel injection control device for an internal combustion engine according to the present invention, the fuel injection control unit injects fuel a plurality of times every cycle of the internal combustion engine, and the fuel-injection-amount correcting unit-corrects the amount of fuel to be injected by an amount of fuel for correction determined for each of the plurality of times of injection.

The fuel injection control device for an internal combustion engine according to the present invention may further comprise a fuel-characteristic determining unit for determining the characteristics of the fuel by detecting the elapse of time from the start of cranking until first combustion. The fuel-injection-amount correcting unit corrects the amount of fuel to be injected by an amount of fuel for correction adjusted in accordance with the determination of the fuel-characteristic determining unit.

BRIEF DESCRIPTION OF THE DRAWINGS

FIG. 9 is a graph showing the adjustment coefficient varying in accordance with the temperature of water in an internal combustion engine using the fuel injection control device according to the present invention;

FIG. 10 is a graph showing the adjustment coefficient varying in accordance with the load on an internal combustion engine using the fuel injection control device according to the present invention;

FIG. 11 is a data table to be used for showing the relationship between the frequency of injection and the amount of fuel for correction shown in FIG. 5:

FIG. 12 is a data table in a matrix to be used for showing combined adjustment coefficients varying in accordance with the temperature of water and the load, as shown in FIGS. 9 and 10, respectively;

DESCRIPTION OF THE PREFERRED EMBODIMENTS

The present invention is described as follows according to embodiments.

First Embodiment

Figure 1:
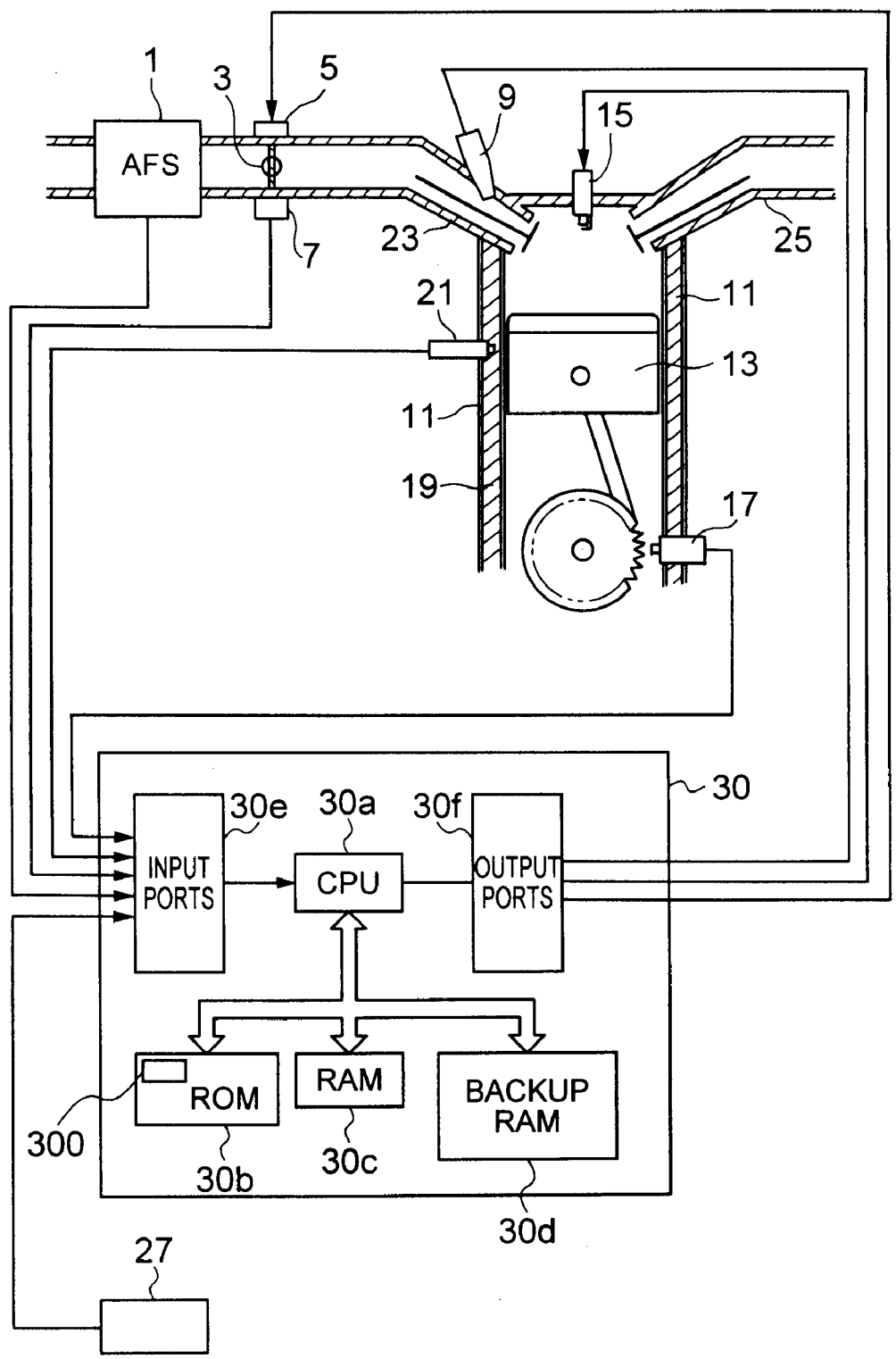
FIG. 1 is an illustration showing a system configuration including a fuel injection control device for an internal combustion engine, according to the present invention.

FIG. 1 shows a configuration of a system including a fuel injection control device according to the present invention. The system shown in FIG. 1 includes an air-flow sensor (AFS) 1 for detecting air flowing in through an air inlet, a throttle 3, a throttle-driving motor 5, a throttle-release sensor 7, an injector 9 for injecting fuel in an: intake pipe, an engine 11 which is an internal combustion engine, a piston 13, an ignition plug 15, a crank-shaft-angle sensor 17, cooling water 19 for cooling the engine 11, a water-temperature sensor 21 for determining the temperature of the cooling water 19, thereby determining the temperatures of the engine 11, an intake pipe 23, an exhaust pipe 25, and an ignition switch 27.

The system also includes an electronic control device 30 for controlling the overall operation of the internal combustion engine, a CPU 30a, a ROM 30b storing programs, data, and the like for the control, a RAM 30c for temporarily storing data and the like during computing, a backup RAM 30d, input ports 30e, and output ports 30f. The crank-shaft-angle sensor 17 forms a revolution determining unit for determining revolution of the engine. The AFS 1 and the throttle-release sensor 7 form a load determining unit for determining the load on the engine. The water-temperature sensor 21 forms a temperature determining unit for determining the temperature of water, thereby determining the temperature of the internal combustion engine.

Figure 2:
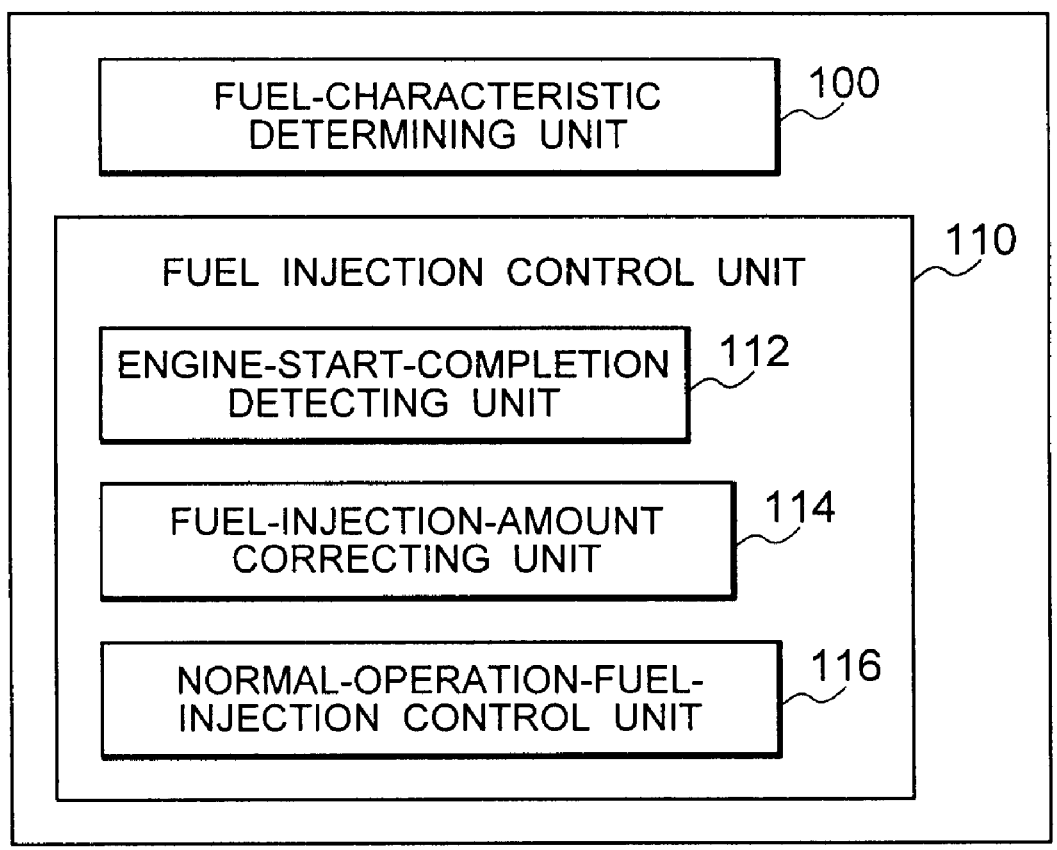
FIG. 2 is a block diagram showing the functions of components of the fuel injection control device for an internal combustion engine, according to the present invention.

FIG. 2 is a block diagram showing the functions of components of the fuel injection control device for an internal combustion engine, according to the present invention. The fuel injection control device includes a fuel-characteristic determining unit 100 for determining the characteristics of the fuel in use, and a fuel injection control unit 110 which includes an engine-start-completion detecting unit 112 for detecting completion of an engine-starting mode, a fuel-injection-amount correcting unit 114 for correcting the amount of fuel to be injected, and a normal-operation-fuel-injection control unit 116 for controlling fuel injection in a normal operation of the engine. These components operate basically in accordance with the programs stored in the electronic control device 30.

Figure 3:
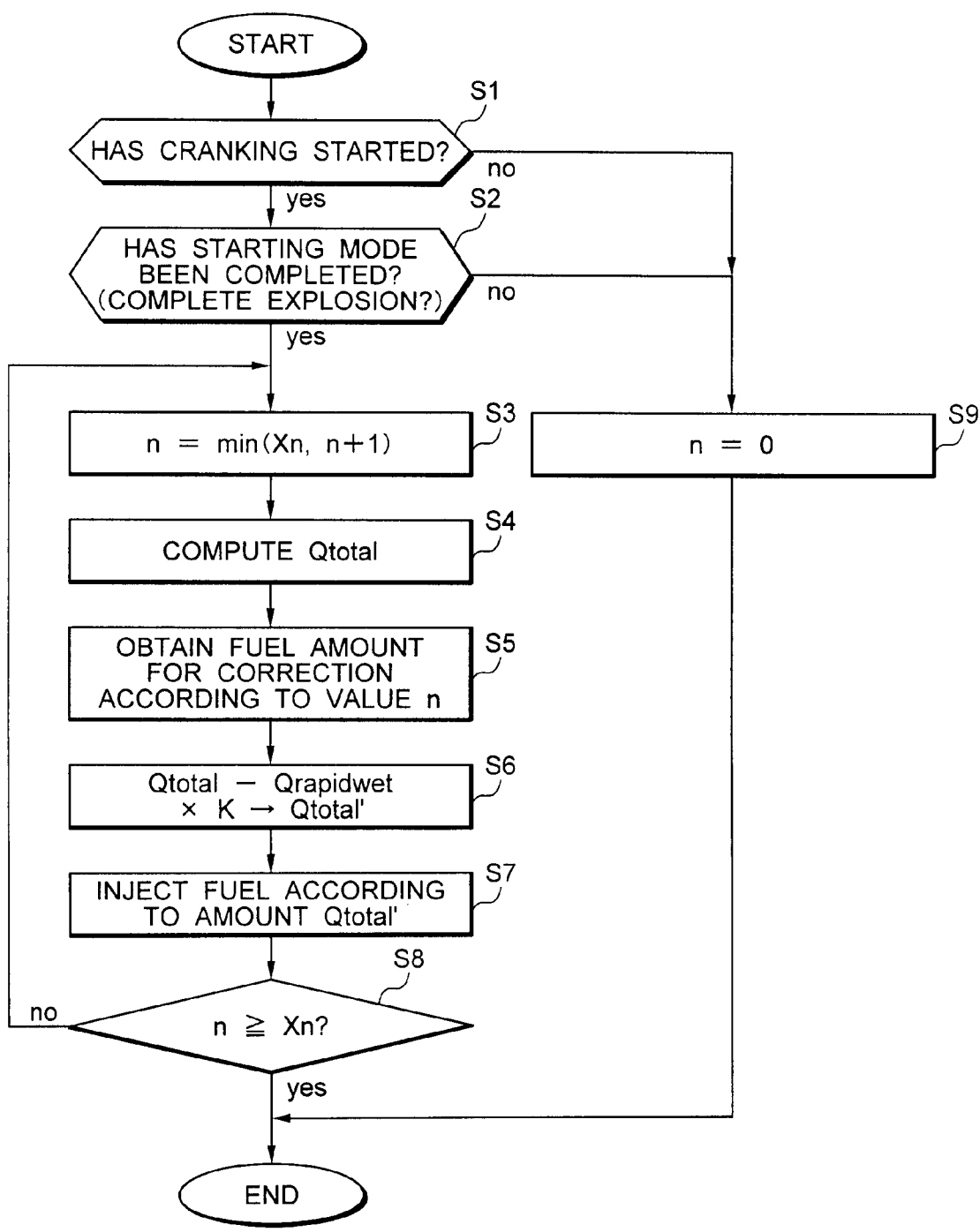
FIG. 3 is a flowchart showing the operation of an engine-start-completion detecting unit and a fuel-injection-amount correcting unit included in the fuel injection control device according to the present invention.
Figure 4:
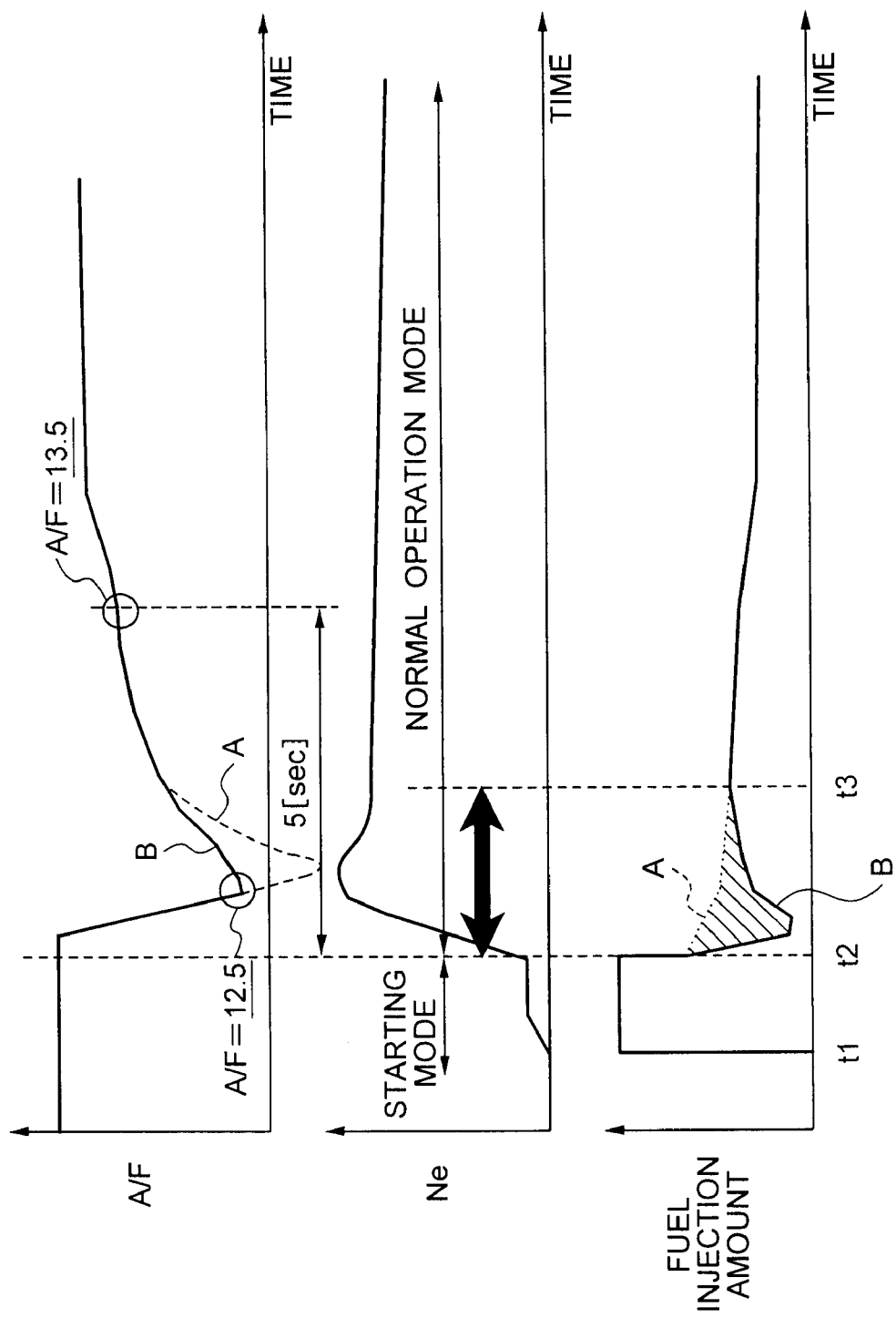
FIG. 4 is a graph showing a ratio A/F of the volume of air to fuel, engine revolution Ne, and the amount of fuel injected, when starting an internal combustion engine using the fuel injection control device according to the present invention, compared with those in an engine using a known fuel injection control device.

FIG. 3 is a flowchart showing the operation of the engine-start-completion detecting unit 112 and a fuel-injection-amount correcting unit 114. FIG. 4 is a graph showing a ratio A/F of the volume of air to fuel, engine revolution Ne, and the amount of fuel injected, when starting an internal combustion engine using the fuel injection control device according to the present invention, compared with those in an engine using a known fuel injection control device.

The fuel injection control device according to the present invention operates as described below. According to the embodiment of the present invention, as shown in FIG. 4, the correction of the amount of fuel to be injected by the injector 9 is performed by a predetermined frequency of injection, at each time correcting the amount of fuel to be injected by an amount of fuel for correction in accordance with, for example, the frequency, during times from t2 to t3 (not always the same period of time) at the beginning of a normal operation mode immediately after the completion of an engine starting mode. The amount of fuel for correction is controlled in accordance with the output from the water-temperature sensor 21 which corresponds to the temperature of the internal combustion engine 11, by considering whether or not the fuel in the intake pipe 23 of the engine 11 is likely to evaporate.

The operation of the engine-start-completion detecting unit 112 and a fuel-injection-amount correcting unit 114 is described with reference to the flowchart in FIG. 3. In step S1, the beginning of engine starting mode is determined by signals from the ignition switch 27 and the crank-shaft-angle sensor 17. In step S2, the completion of the engine starting mode is detected by the engine-start-completion detecting unit 112 by determining the internal combustion engine 11 in a full combustion state at a revolution of, for example, 500 rpm.

The processes in steps S3 to S8 are repeated a predetermined number of times (frequency) of injection. Xn denotes the predetermined frequency of injection, and n denotes an ordinal number of a time (frequency) of the injection.

In step S4, the amount of fuel to be injected Qtotal is obtained by the following expression (1) in the same manner as in a known device.

$$Qtotal = KQPLS \times Ec \times Cwt \times C_{as} \quad (1)$$

In the expression (1), KQPLS denotes a discharge-amount converting coefficient, Ec denotes a filling efficiency (obtained by revolution speed of the engine and the volume of intake air), Cwt denotes a warm-up correction coefficient (correction coefficient of the parameter of water temperature; the number of the coefficient being larger as the water temperature is higher), and $C_{as}$ denotes a fuel-increasing coefficient immediately after the completion of an engine-start mode (being at a high level immediately after the engine-start mode (at approximately 500 rpm) and gradually decreased thereafter synchronized with the revolution speed of the internal combustion engine, the fuel-increasing coefficient having substantially a trapezoidal line from the start of the engine).

The expression (1) includes only fundamental factors.

Figure 5:
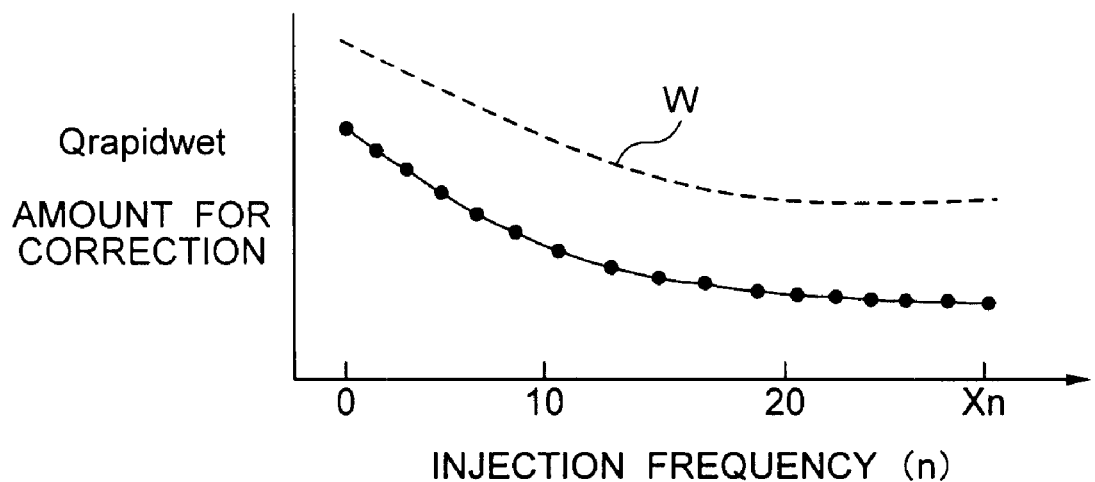
FIG. 5 is a graph showing the relationship between the frequency of injection and the amount of fuel for correction in the fuel injection control device according to the present invention.

In step S5, an amount of fuel for correction Qrapidwet is obtained in accordance with the frequency of injection n. The amount of fuel for correction Qrapidwet is obtained from a data table showing the relationship between the frequency of injection n and the amount of fuel for correction Qrapidwet which is obtained in advance, as shown in FIG. 5, and is being stored in the ROM 30*b* (refer to numeral 300 in FIG. 1).

In step S6, a corrected amount of fuel to be injected Qtotal' is obtained by subtracting the amount of fuel for correction Qrapidwet from the amount of fuel before correction to be injected Qtotal obtained by the expression (1). The amount of fuel for correction Qrapidwet may be adjusted in accordance with the temperature of the internal combustion engine 11 to be obtained from signals from the water-temperature sensor 21 by considering, for example, the evaporability of fuel. In this case, the adjustment coefficient is obtained from a data table prepared in the same way as shown in FIG. 11 showing the relationship between the temperature of water and an adjustment coefficient Kwt, as shown in FIG. 9, which is obtained in advance, and stored in the ROM 30*b* (refer to numeral 300 in FIG. 1). The product of the amount of fuel for correction Qrapidwet and the adjustment coefficient Kwt as a coefficient K obtained according to the temperature of water is subtracted from the amount of fuel to be injected Qtotal, thereby obtaining a corrected amount of fuel to be injected Qtotal'.

In step S7, fuel is injected by the injector 9 in which the injection is controlled so that the corrected amount of fuel Qtotal' is injected.

The operation in steps S4 to S7 is repeatedly performed until an expression n=Xn is satisfied, whereby the fuel is injected by Xn times (see the fuel-injection-amount correcting unit 114 in FIG. 2).

With this arrangement, the fuel consumption at the beginning of the normal operation mode immediately after the completion of the engine-starting mode is decreased as shown by a solid line B in FIG. 4, representing the amount of fuel injection, and the ratio A/F of the volume of air to fuel is maintained at a level of 12.5 as shown by another solid line B, thereby reducing the amount of combustion exhaust gas immediately after the completion of starting the internal combustion engine.

Figure 7:
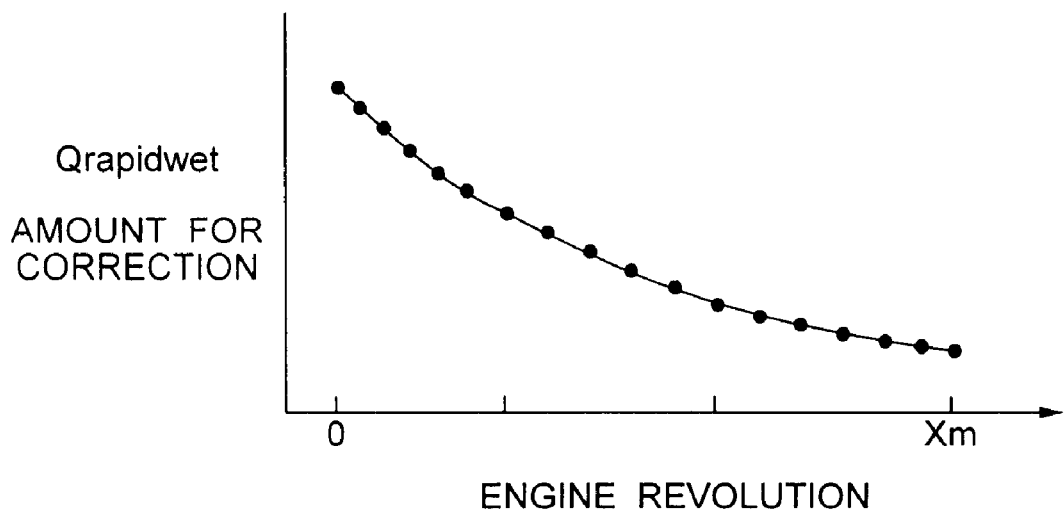
FIG. 7 is a graph showing the relationship between the amount of fuel for correction and the revolution of an internal combustion engine using the fuel injection control device according to the present invention.
Figure 8:
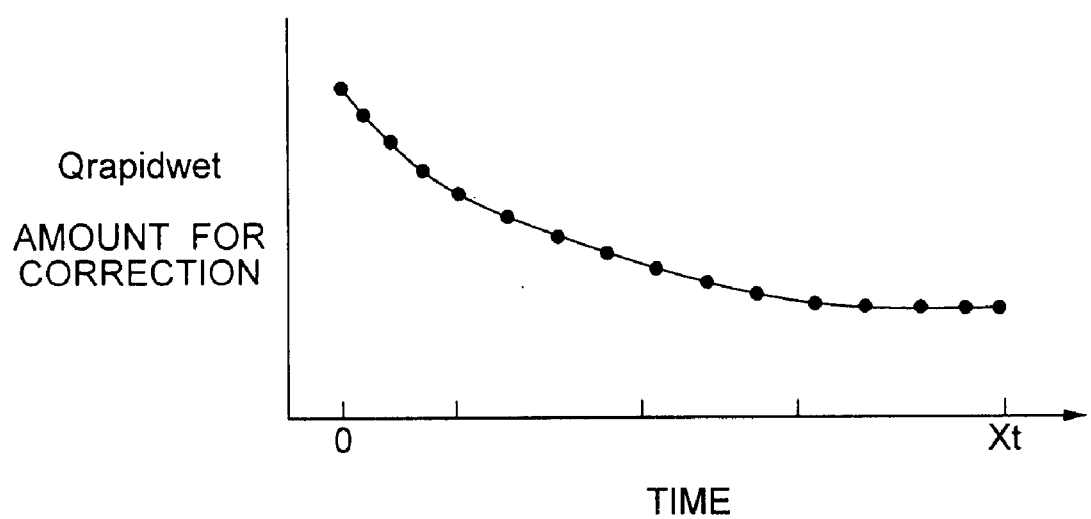
FIG. 8 is a graph showing the relationship between the amount of fuel for correction and the elapse of time in operation of an internal combustion engine using the fuel injection control device according to the present invention.

Although the amount of fuel for correction Qrapidwet is obtained in accordance with the frequency of injection, according to the present embodiment, the amount of fuel for correction Qrapidwet may be obtained from a data table showing the relationship between revolution m of the internal combustion engine and the amount of fuel for correction Qrapidwet, as shown in FIG. 7, or between elapse of time t and the amount of fuel for correction Qrapidwet obtained in advance from a test or the like, as shown in FIG. 8, the data table being stored in the ROM 30*b* (refer to numeral 300 in FIG. 1).

The revolution m of the internal combustion engine and the elapse of time t can be easily obtained from the crankshaft-angle sensor 17 and a timer (stored, for example, in the ROM 30*d* shown in FIG. 1), respectively.

Although the amount of fuel for correction Qrapidwet is adjusted according to a water temperature WT which is the temperature of the internal combustion engine, according to the present embodiment, the amount of fuel for correction Qrapidwet may be adjusted according to an adjustment coefficient Kload which varies in accordance with a load Load on the internal combustion engine, as shown in FIG. 10. The adjustment coefficient Kload may be obtained from a data table in the same way as shown in FIG. 11 showing the relationship between the load Load on the internal combustion engine and the adjustment coefficient Kload obtained in advance from a test or the like, as shown in FIG. 10, the data table being stored in the ROM 30*b* (refer to numeral 300 in FIG. 1).

The load Load on the internal combustion engine can be obtained from a signal of the AFS 1 and the revolution speed of the internal combustion engine.

Figure 12:
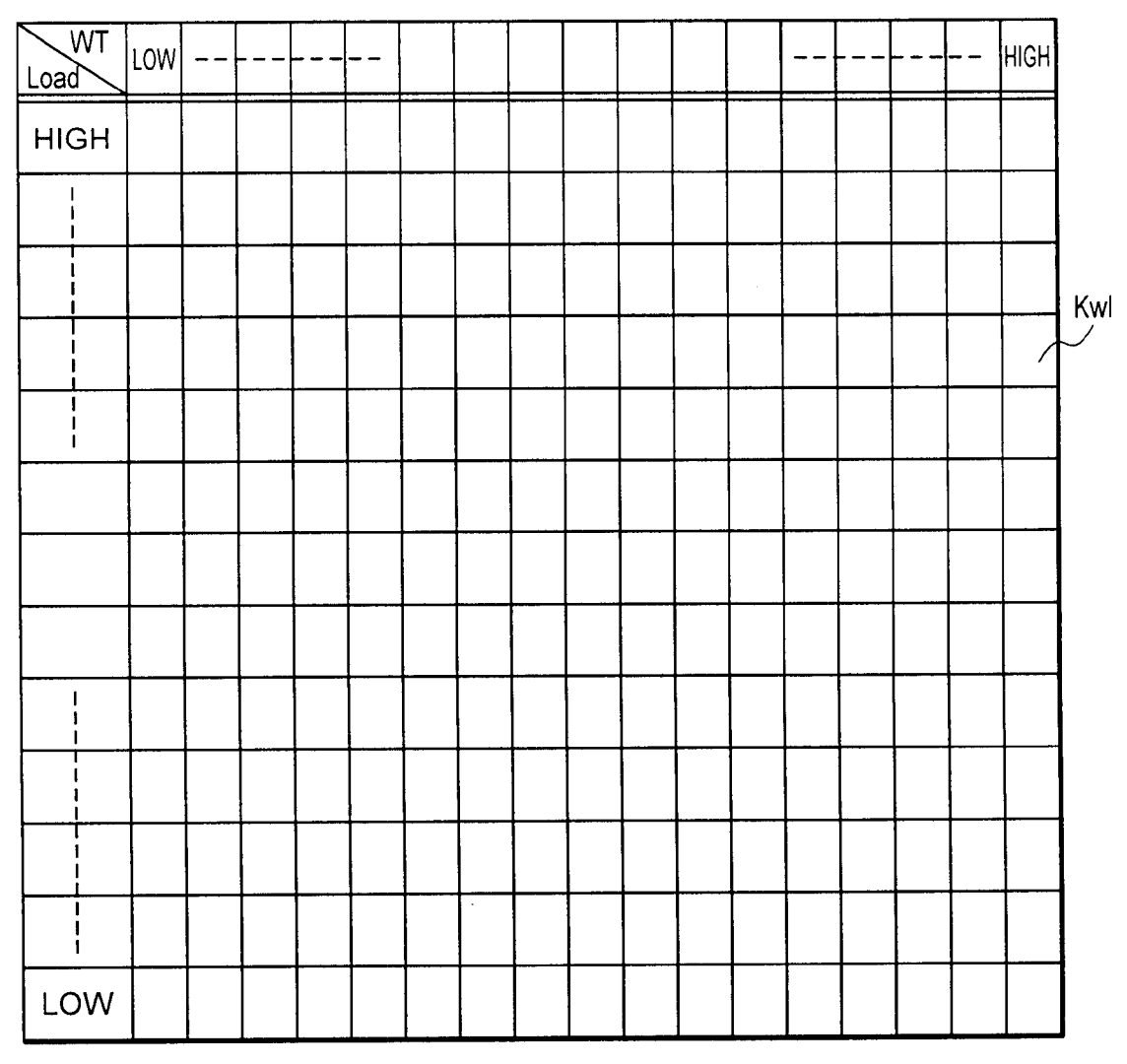

The amount of fuel for correction Qrapidwet may be adjusted in accordance with the water temperature WT and the load Load. In this case, the characteristics of the adjustment coefficient Kwt according to the water temperature WT shown in FIG. 9 tend to shift in a direction of a dashed-lined arrow Load as the load Load is decreased, as shown in FIG. 9. A combined adjustment coefficient Kwl according to the water temperature WT and the load Load may be obtained from a data table formed in a matrix of the water temperature WT and the load Load shown in FIG. 12, the data table being stored in the ROM 30*b* (refer to numeral 300 in FIG. 1). The data table can be used for the correction of the amount of fuel to be injected, in accordance with either the frequency of fuel injection, the revolution speed of the internal combustion engine, or the elapse of time.

Figure 13:
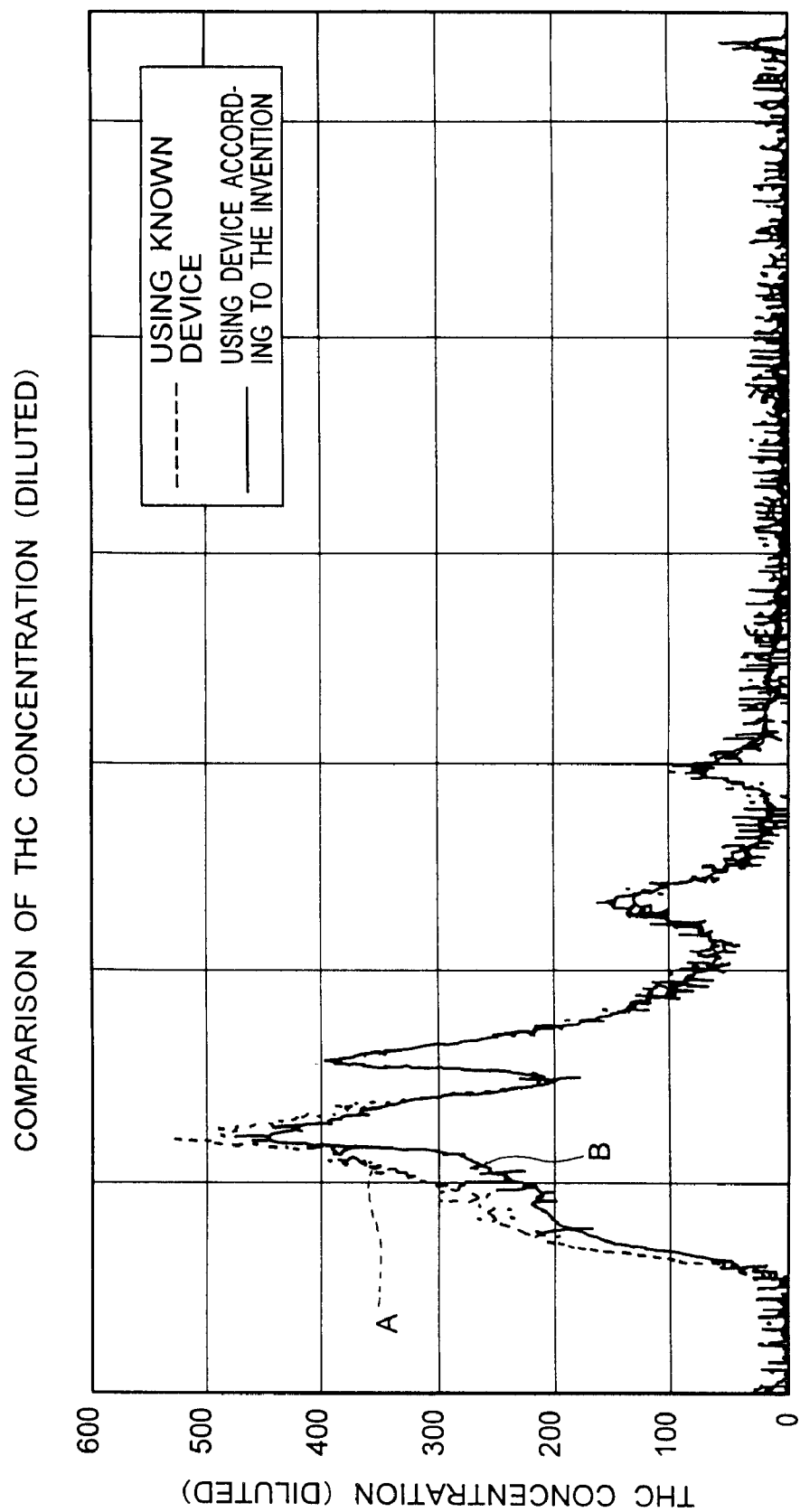
FIG. 13 is a graph showing a result of a test in which total hydrocarbon densities in the exhaust gas immediately after the engine started were measured in comparison between internal combustion engines using the fuel injection control device according to the present invention and a known fuel injection control device.

FIG. 13 shows a result of a test of the above-described correction of the amount of fuel to be injected. A graph in FIG. 13 shows total hydrocarbon (THC) concentration which is proportional to the amount of fuel contained in exhaust gas. In the graph, dotted lines A show the THC concentration in the exhaust gas from an engine using a known fuel injection control device and solid lines B show that in the exhaust gas from an engine using the fuel injection control device according to the present invention, each being measured in a normal operation mode immediately after the engine-starting mode. The THC concentration in the exhaust gas from the engine using the fuel injection control device according to the present invention was lower than the other by approximately 10%.

Second Embodiment

Figure 6:
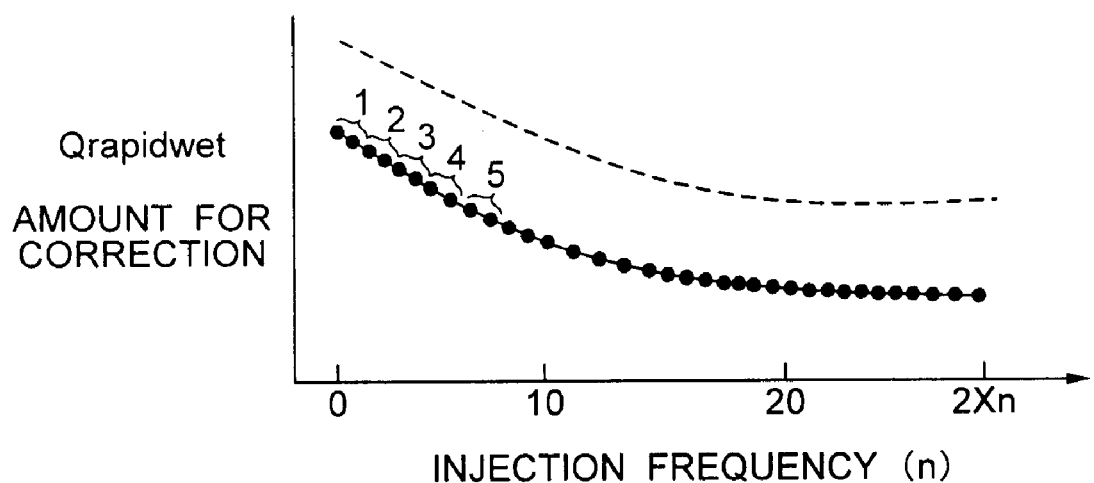
FIG. 6 is a graph showing the relationship between the amount of fuel for correction and the frequency of injection by the fuel injection control device according to the present invention, in which the fuel is injected twice every cycle.

In the first embodiment, the fuel injection control device according to the present invention is used in an internal combustion engine in which the fuel is injected once every cycle. In another type of internal combustion engine, the injection is performed a plurality of times every cycle so as to make the concentration of fuel more even throughout the cylinder. In this type of engine, the amount of fuel to be injected can be controlled more precisely by correcting the amount of fuel to be injected at each injection, as shown in FIG. 6. FIG. 6 shows an example in which the fuel is injected twice every cycle, two dots shown in the drawing corresponding to one cycle.

Third Embodiment

Figure 14:
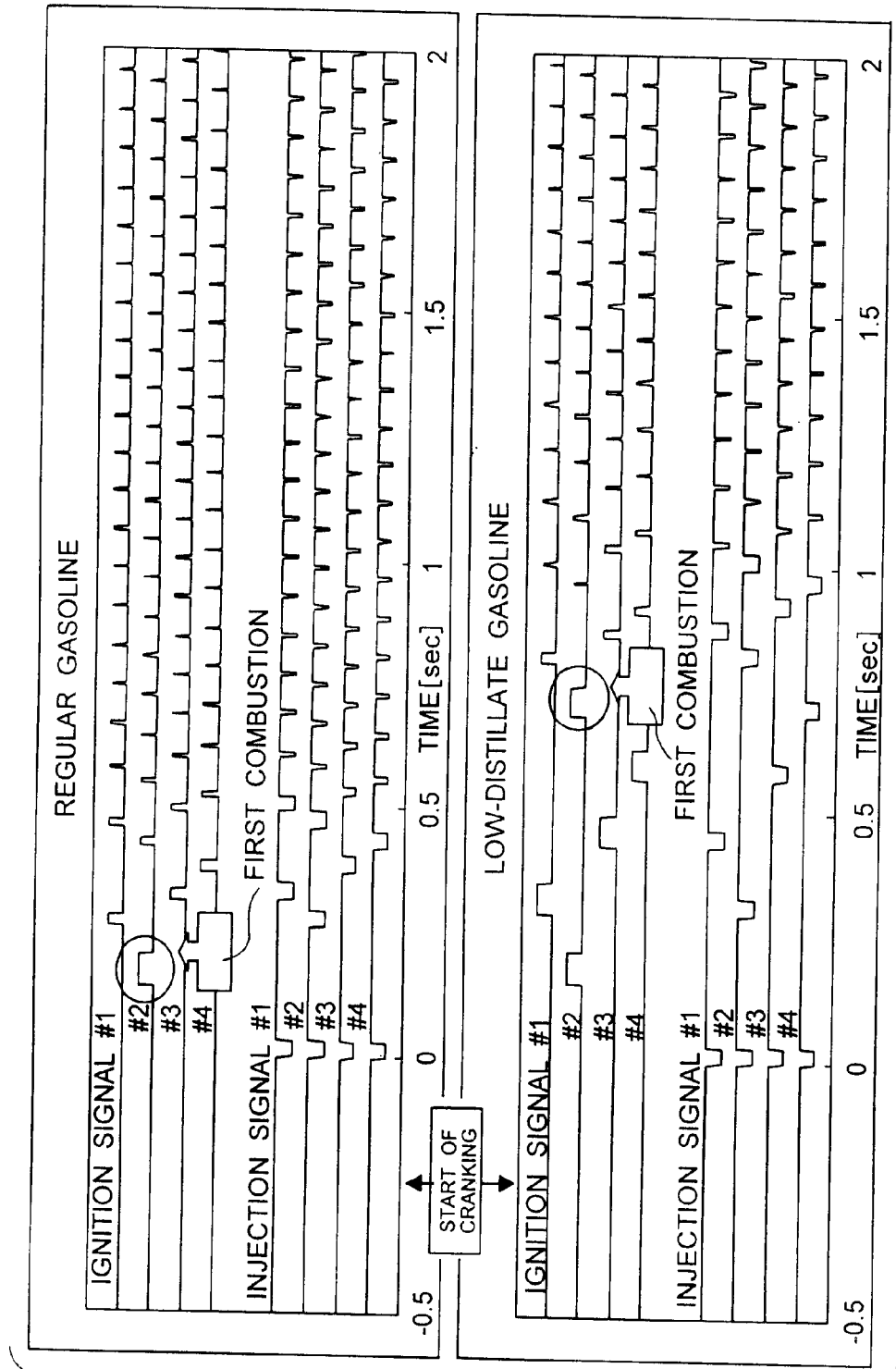
FIG. 14 is a chart for describing a fuel-characteristic determining unit used in the fuel injection control device according to the present invention.
Figure 15:
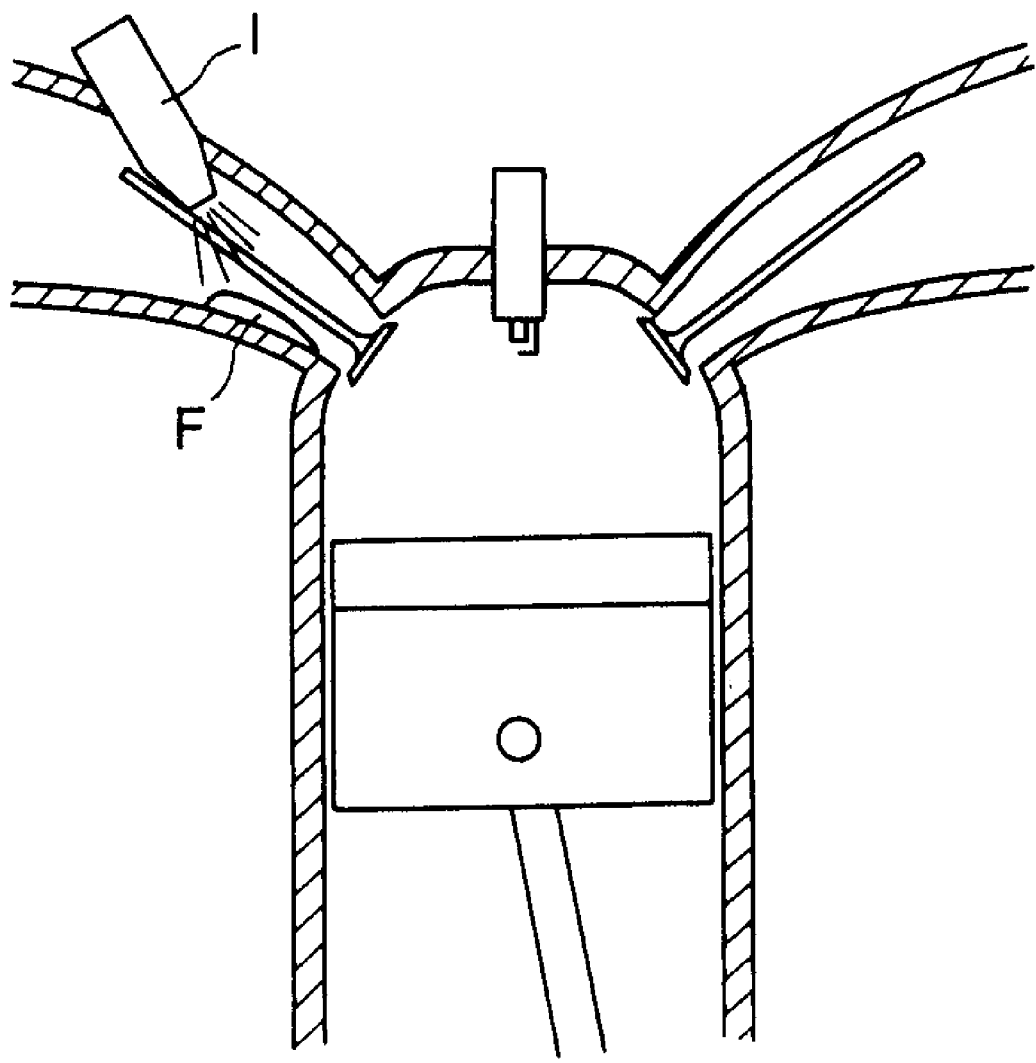
FIG. 15 is an illustration of fuel adhered to the inside of an intake pipe when starting an engine.

Certain types of the fuel have relatively low combustion quality. In FIG. 14, a part (a) of a chart shows ignition signals and injection signals when starting an internal combustion engine using a regular fuel, and a part (b) of the chart shows these signals when starting the engine using a low-distillate fuel having lower combustion quality. As shown in FIG. 14, it takes longer from the start of cranking until a first combustion when using the low-distillate fuel (b) than when using the regular fuel (a).

The fuel-characteristic determining unit 100 shown in FIG. 2 determines the characteristics of the fuel in use by determining the time taken from the start of cranking until the first combustion by detecting a crank-shaft-angle signal output from the crank-shaft-angle sensor 17 and a signal output from a timer included in the ROM 30d. When using a low-distillate fuel, the relationship, shown in FIG. 5, between the frequency of injection n and the amount of fuel for correction Qrapidwet is shown by dashed lines W in the same drawing. Data tables, as shown in FIG. 11, are prepared for the regular fuel and for the low-distillate fuel having a lower combustion quality, respectively, in accordance with, for example, the solid line and the dashed lines W in FIG. 5, respectively. The data tables are stored in the ROM 30b (refer to numeral 300 in FIG. 1), and a corresponding one of them is used according to the determination of the fuel-characteristic determining unit 100. With this arrangement, the amount of fuel to be injected can be corrected properly in accordance with the characteristics of the fuel in use, thereby further reducing combustion exhaust gas.

The data tables described in the embodiments above are prepared based on data obtained by experiments or the like performed on each internal combustion engine and each type of fuel, and are stored in the ROMs.

According to the present invention, as described above, the fuel injection control device includes a revolution determining unit for determining revolution of an internal combustion engine, an injector for injecting fuel into the internal combustion engine, and a fuel injection control unit for controlling the injection of fuel of the injector. The fuel injection control unit includes an engine-start-completion detecting unit for detecting whether or not the internal combustion engine has started, and a fuel-injection-amount correcting unit for correcting the amount of fuel to be injected, after the engine has started, by an amount of fuel for correction obtained by considering the amount of fuel remaining uncombusted when starting the engine and in accordance with one of the number of times (frequency) of fuel injection, revolution of the internal combustion engine, and the elapse of time. With this arrangement, the amount of fuel injected is reduced, in a normal operation mode immediately after an engine-starting mode, by correcting the amount of fuel to be injected by considering the amount of the fuel adhered to the inner wall and the like of an intake pipe in the engine-starting mode, thereby reducing combustion exhaust gas immediately after the internal combustion engine is started, and reducing total hydrocarbon concentration in the exhaust gas.

The fuel injection control device is provided with at least one of a load determining unit for determining the load on the internal combustion engine and an engine-temperature determining unit for determining the temperature of the internal combustion engine. In the above-described fuel-injection-amount correcting unit, the amount of fuel for correction is adjusted in accordance with at least one of the load on the internal combustion engine and the temperature thereof, whereby a more precise fuel injection control is made possible, in which the load on the internal combustion engine and the temperature thereof are considered.

The fuel injection control unit injects fuel a plurality of times every cycle of the internal combustion engine, and the fuel-injection-amount correcting unit corrects the amount of fuel to be injected by the amount of fuel for correction determined for each of the plurality of times of injection, whereby an effective fuel injection control can be performed in the internal combustion engine in which the fuel is injected the plurality of times every cycle.

The fuel injection control device according to the present invention also includes a fuel-characteristic determining unit for determining the characteristics of the fuel by detecting the elapse of time from the start of cranking until a first combustion. The fuel-injection-amount correcting unit corrects the amount of fuel to be injected by an amount of fuel for correction adjusted in accordance with the determination of the fuel-characteristic determining unit, whereby the fuel injection control can be performed properly according to the characteristics of the fuel.

What is claimed is:

1. A fuel injection control device for an internal combustion engine, comprising:

revolution determining means for determining revolution of the internal combustion engine;

an injector for injecting fuel into the internal combustion engine;

fuel injection control means for controlling the injection of fuel of the injector, wherein the fuel injection control means include engine-start-completion detecting means for detecting whether or not the internal combustion engine has started, and fuel-injection-amount correcting means for correcting the amount of fuel to be injected, after the engine has started, by an amount of fuel for correction obtained by considering the amount of fuel remaining uncombusted in an air intake valve when starting the engine and in accordance with one of the frequency of fuel injection, revolution of the internal combustion engine, and the elapse of time; and a load determining means for determining the load on the internal combustion engine and an engine-temperature determining means for determining the temperature of the internal combustion engine, wherein, in the fuel-injection-amount correcting means, the amount of fuel for correction is adjusted in accordance with the load on the internal combustion engine and the temperature thereof.

2. A fuel injection control device for an internal combustion engine according to claim 1, wherein the fuel injection control means inject fuel a plurality of times every cycle of the internal combustion engine, and the fuel-injection-amount correcting means correct the amount of fuel to be injected by an amount of fuel for correction determined for each of the plurality of times of injection.

3. A fuel injection control device for an internal combustion engine, according to claim 1, further comprising:

fuel-characteristic determining means for determining the characteristics of the fuel by detecting the elapse of time from the start of cranking until a first combustion, wherein the fuel-injection-amount correcting means correct the amount of fuel to be injected by an amount of fuel for correction adjusted in accordance with the determination of the fuel-characteristic determining means.

4. A fuel injection control device for an internal combustion engine, according to claim 2, further comprising:

fuel-characteristic determining means for determining the characteristics of the fuel by detecting the elapse of time from the start of cranking until a first combustion, wherein the fuel-injection-amount correcting means correct the amount of fuel to be injected by an amount of fuel for correction adjusted in accordance with the determination of the fuel-characteristic determining means.

* * * * *